UNITED STATES PATENT OFFICE.

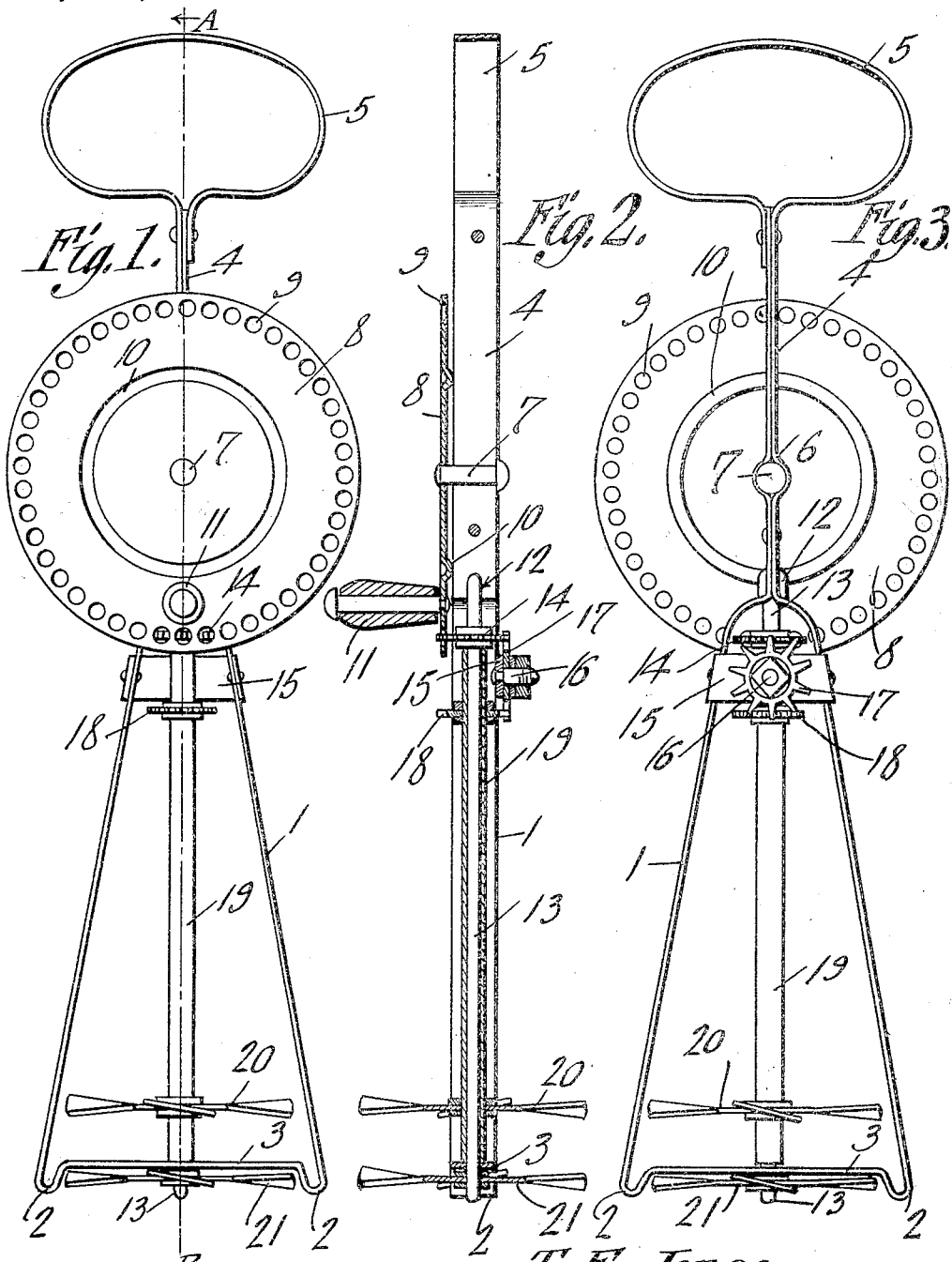

THOMAS E. JONES, OF HAMMOND, INDIANA.

EGG-BEATER.

1,246,104.  Specification of Letters Patent.  Patented Nov. 13, 1917.

Application filed March 16, 1916. Serial No. 84,640.

*To all whom it may concern:*

Be it known that I, THOMAS E. JONES, a citizen of the United States, residing at Hammond, in the county of Lake and State of Indiana, have invented a new and useful Egg-Beater, of which the following is a specification.

This invention relates to an egg beater, one of the objects being to provide a structure of this character made up almost entirely of sheet metal and which can consequently be manufactured cheaply.

A further object is to provide a structure of this type which is simple and compact in construction and which will operate easily.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a front elevation of the egg beater.

Fig. 2 is a section on line A—B Fig. 1.

Fig. 3 is a rear elevation thereof.

Referring to the figures by characters of reference 1 designates a substantially triangular frame made from a single strip of metal folded to produce depending loops 2 at the ends of the base portion 3 thereof while the upwardly converging sides of the frame merge into a stem 4 terminating in a loop or handle 5. The two thicknesses of metal forming the stem 4 are spread apart as at 6 to provide an opening for the reception of a bearing pin 7 on one end portion of which is journaled a disk 8. This disk is preferably formed of sheet metal and has a circular series of openings 9 therein close to its periphery. For the purpose of spacing this disk from the stem 4 a circular bead 10 is preferably struck inwardly from the disk as shown. A handle 11 extends laterally from the disk and by means thereof said disk can be rotated readily.

The lower portions of the two thicknesses forming the stem 4 are formed with registering recesses 12 which coöperate to form a socket constituting a bearing for the upper end of a shaft 13 which can be made of stiff wire, the lower end portion of the shaft being extended through the bottom 3 of the frame 1. Secured to this shaft is a gear 14 which can be cut from sheet metal and the teeth of which are sufficiently long to project into the adjacent openings 9 so that when the disk 8 is rotated motion will be transmitted through gear 14 to shaft 13. A side plate 15 is secured to the frame 1 and has a stud 16 outstanding therefrom. On this stud is journaled a gear 17 preferably cut from sheet metal and which meshes with the gear 14 and with another similar gear 18 secured to a tubular shaft 19. This tubular shaft is journaled on the shaft 13 and bears at its lower end upon the base 3. This tubular shaft by extending under the gear 14 constitutes a support for the shaft 13. Secured to the tubular shaft 19 near its lower end is an agitating wheel 20 having segmental blades while another agitating disk 21 of similar form is secured to the lower end of the shaft 13. The two wheels can be readily formed of sheet metal and may be fastened to the respective shafts 13 and 19 in any manner desired.

It will be obvious that when the disk 8 is rotated motion will be transmitted therefrom through gear 14 to shaft 13 and agitating wheel 21, and, through gears 14, 17 and 18 to the tubular shaft 19 and its wheel 20. Consequently the two wheels will be rotated in opposite directions respectively, the blades of one wheel serving to direct the agitated material in one direction while the blades of the other wheel will direct the agitated material in the opposite direction, the opposed currents resulting in the rapid breaking up of the material being agitated.

It will be seen that practically every portion of the device can be made of sheet metal and thus produced cheaply, the resultant structure being durable, compact and easy to operate.

By providing the depending loops 2 the agitating wheel 21 is held out of contact with the bottom of the container in which the device is operated. This construction also permits the wheel 21 to be hung below the base 3 and so interpose a stationary element between the oppositely revolving wheels, which aids greatly in the proper and rapid beating of the eggs.

What is claimed is:—

1. An egg beater, comprising a supporting frame, agitating wheels journaled in the frame, a stationary arm interposed between the agitating wheels, and means for revolving the wheels simultaneously in opposite directions.

2. An egg beater, comprising a supporting frame, legs on the frame, a cross bar forming a base, shafts journaled in the frame, an agitating wheel mounted on one shaft above the base, an agitating wheel mounted on the other shaft below the base, and means for revolving the wheels in opposite directions.

In testimony that I claim the foregoing as my own, I have hereto affixed my signature in the presence of two witnesses.

THOMAS E. JONES.

Witnesses:
H. M. JOHNSON,
L. G. EDER.